United States Patent [19]

Hietanen et al.

[11] 3,749,496

[45] July 31, 1973

[54] AUTOMATIC QUALITY CONTROL SURFACE INSPECTION SYSTEM FOR DETERMINING THE CHARACTER OF A SURFACE BY MEASURING THE SHAPE AND INTENSITY OF A MODULATED BEAM

[75] Inventors: Edwin D. Hietanen, Birmingham, Mich.; Robert J. Valek, Brookfield, Wis.

[73] Assignee: The Bendix Corporation, Southfield, Mich.

[22] Filed: July 16, 1971

[21] Appl. No.: 163,220

[52] U.S. Cl. ............ 356/73, 250/219 DF, 356/120, 356/167, 356/237
[51] Int. Cl. ...................... G01n 21/00, G01n 21/32
[58] Field of Search................... 356/241, 237, 120, 356/156, 158, 167, 210, 211, 212, 73; 250/219 DF

[56] References Cited
UNITED STATES PATENTS

| | | | |
|---|---|---|---|
| 2,315,282 | 3/1943 | Snow | 356/211 |
| 3,590,258 | 6/1971 | Shibata et al. | 356/237 |
| 2,547,545 | 4/1951 | Strong | 356/73 |
| 3,551,061 | 12/1970 | Glowa | 356/241 |
| 2,313,218 | 3/1943 | Brace et al. | 356/210 |

*Primary Examiner*—Ronald L. Wibert
*Assistant Examiner*—Vincent P. McGraw
*Attorney*—John S. Bell

[57] ABSTRACT

An apparatus that automatically inspects the inside surface of a cylindrical workpice, such as a brake cylinder, by reflecting a beam of laser light from that surface. The intensity of the reflected beam is measured to detect the presence and severity of any surface flaws. The shape of the beam is measured to determine the smoothness of the cylinder surface. A computer compares the measured intensities and shapes of the reflected beam with predetermined intensity and shape values to determine the quality of the workpiece surface.

5 Claims, 2 Drawing Figures

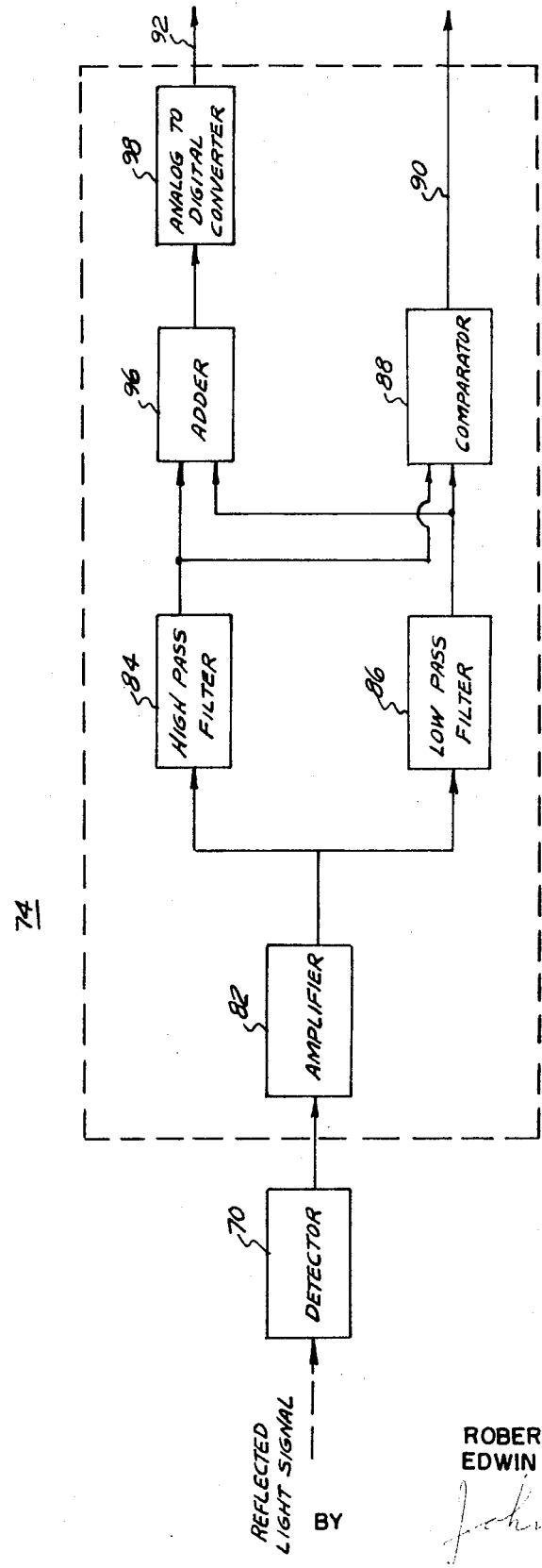

AUTOMATIC QUALITY CONTROL SURFACE INSPECTION SYSTEM FOR DETERMINING THE CHARACTER OF A SURFACE BY MEASURING THE SHAPE AND INTENSITY OF A MODULATED BEAM

BACKGROUND OF THE INVENTION

1. Field of the Invention

Quality control surface inspection.

2. Brief Description of the Prior Art

There are a number of systems that measure only the intensity of a beam reflected from a surface in order to determine the quality of that surface. These systems provide incomplete information concerning the nature of the surface because the intensity of a reflected beam is determined by two unrelated factors, namely the smoothness of the surface and the inherent reflectivity of the material. A change in measured intensity does not indicate whether the smoothness or the reflectivity of the surface being inspected has changed.

One system for measuring the shape of a light beam reflected from a surface in order to determine the quality of that surface is also known. The system includes a transducer for detecting the reflected beam, and a chopper wheel which rotates in front of the transducer and thus controls the transmission of the beam to the transducer. The chopper wheel alternately, progressively increases and decreases the field of view of the transducer. Signal processing apparatus measures the time rate of change of the intensity of the beam striking the transducer. Because the intensity of the beam striking the transducer is determined by the position of the chopper wheel, this time rate of change measurement indicates the spatial distribution, or in other words the pattern of the cross section of the reflected beam.

This system measures only the shape of the reflected beam and therefore also provides an incomplete indication of the nature of a surface. The shape of a reflected beam is determined both by the curvature and the smoothness of the reflecting surface. This system is thus readily used to determine the quality of flat surfaces only. It is not recognized that a more complete determination of the quality of surfaces having more diverse shapes can be obtained by measuring both the shape and the intensity of a reflected beam. Further, this system is not a fully automatic inspection system in that it does not include any apparatus for processing the shape measurements to indicate whether the quality of the surface being inspected is acceptable or not.

SUMMARY OF THE INVENTION

The subject invention comprises a system for directing a beam of wave energy such as a beam of laser light to strike and be modulated by the surface of a workpiece. The shape of the modulated beam is measured in order to determine the smoothness of the surface. The intensity of the modulated beam is measured in order to determine whether the surface contains any flaws, and also to determine the severity of any flaws that might be detected. The term "flaw" is used herein to designate any local surface irregularity. Cracks, local changes in the surface roughness, and rust spots are three types of flaws that are readily detected with the apparatus of this invention. The invention possesses a number of significant advantages over the prior art systems. For example, because the system measures both shape and intensity of the modulated beam, it provides a more complete determination of the quality of a workpiece surface than do prior art systems that measure only intensity or only shape but that do not measure both. Further, the measurement of both shape and intensity of a modulated beam permits the inspection of surfaces having curved or irregular shapes that cause the modulated beam received from different portions of the surface to have different shapes.

The system of this invention also includes comparing apparatus such as a computer for comparing smoothness and flaw measurements with predetermined values in order to determine whether the part being inspected is defective. In the embodiment illustrated herein, a laser beam is scanned across the surface being inspected. A flaw is signaled by a change in the intensity of the modulated or reflected beam. The intensity measuring apparatus of this invention provides two output signals to the computer comparator apparatus, namely a first signal which indicates the value of the measured intensity, and a second signal which indicates whether the measured intensity has changed from the previously measured intensities. The computer is adapted to process the measured intensities only upon receipt of the signal indicating a change in the value of the measured intensity. The computer thus need not continuously process intensity measurements during inspection of a part, but need only process those measurements when a flaw is detected in order to determine the severity of that flaw. Because the computer is required to process intensity measurements only when a flaw is detected, the computer calculating apparatus used to compare measured intensities can also be used to generate signals that control the operation of the other elements of the inspection system. The generation of these control signals is interrupted to calculate the nature of a flaw only when a flaw is detected. The surface inspection system of this invention thus requires only a relatively small and inexpensive computer calculating apparatus in order to provide a completely automatic inspection of workpiece surfaces.

The system of this invention for measuring curved and other irregular surfaces also includes beam shape measuring apparatus that is uniquely adapted to measure the shape of the modulated beam representing only predetermined reference positions having identical curvature. As used herein, positions having identical curvatures have identical magnitudes and directions of curvature. The term "direction of curvature" refers to the direction along which a curved surface changes the distribution of a reflected beam from the distribution that would be provided if the beam were reflected from a flat surface. The intensity of the modulated beam received from all positions on the surface being inspected is measured. Local changes in surface roughness are detected by this intensity measuring apparatus and are recorded as local flaws. The computer processes these measurements to determine whether a local rough spot is either so rough or so large as to make the workpiece unacceptable.

Beam shape measuring apparatus for inspecting the inside surface of a cylindrical workpiece is illustrated herein. This apparatus includes a reflecting mirror adapted to be positioned inside a cylindrical workpiece and to be rotated with respect to the workpiece in order to scan an inspecting beam across that surface. The inspecting beam is modulated by, and reflected from the inside cylinder surface. The apparatus for measuring the shape of the reflected beam includes a detector for receiving that reflected beam and a light chopper for controlling the transmission of the modulated beam to the detector. The shape of the modulated beam striking the detector is determined by measuring the time rate of change of the intensity of the signal striking the detector. Since the portion of the modulated beam allowed to strike the detector is determined by operation of the chopper, this intensity variation indicates the cross-sectional shape of the modulated beam. The beam chopper undergoes the same relative rotation as the mirror disposed in the cylindrical workpiece. The chopper includes only two notches disposed 180° apart that permit light to strike the transducer. Because of the design and rotational rate of the chopper, the transducer receives only light reflected from the longitudinal lines along the inside surface of the cylindrical workpiece that are separated by a diameter of the workpiece. All points along both of these lines have the same direction of curvature that causes the beam cross section to have one predetermined shape in the absence of any change in surface roughness. There is thus no need to separate differences in the shape of the modulated beam caused by changes in the curvature of the surface being inspected from those caused by changes in the smoothness of that surface.

BRIEF DESCRIPTION OF THE DRAWINGS

Further objects, features, and advantages of this invention, which is defined by the appended claims, will become apparent from a consideration of the following description and the accompanying drawings in which:

FIG. 2 is a schematic, circuit diagram of the apparatus shown in FIG. 1 for measuring the intensity of a reflected or modulated beam.

DETAILED DESCRIPTION OF THE PREFERRED EMBODIMENT

Figure 1:
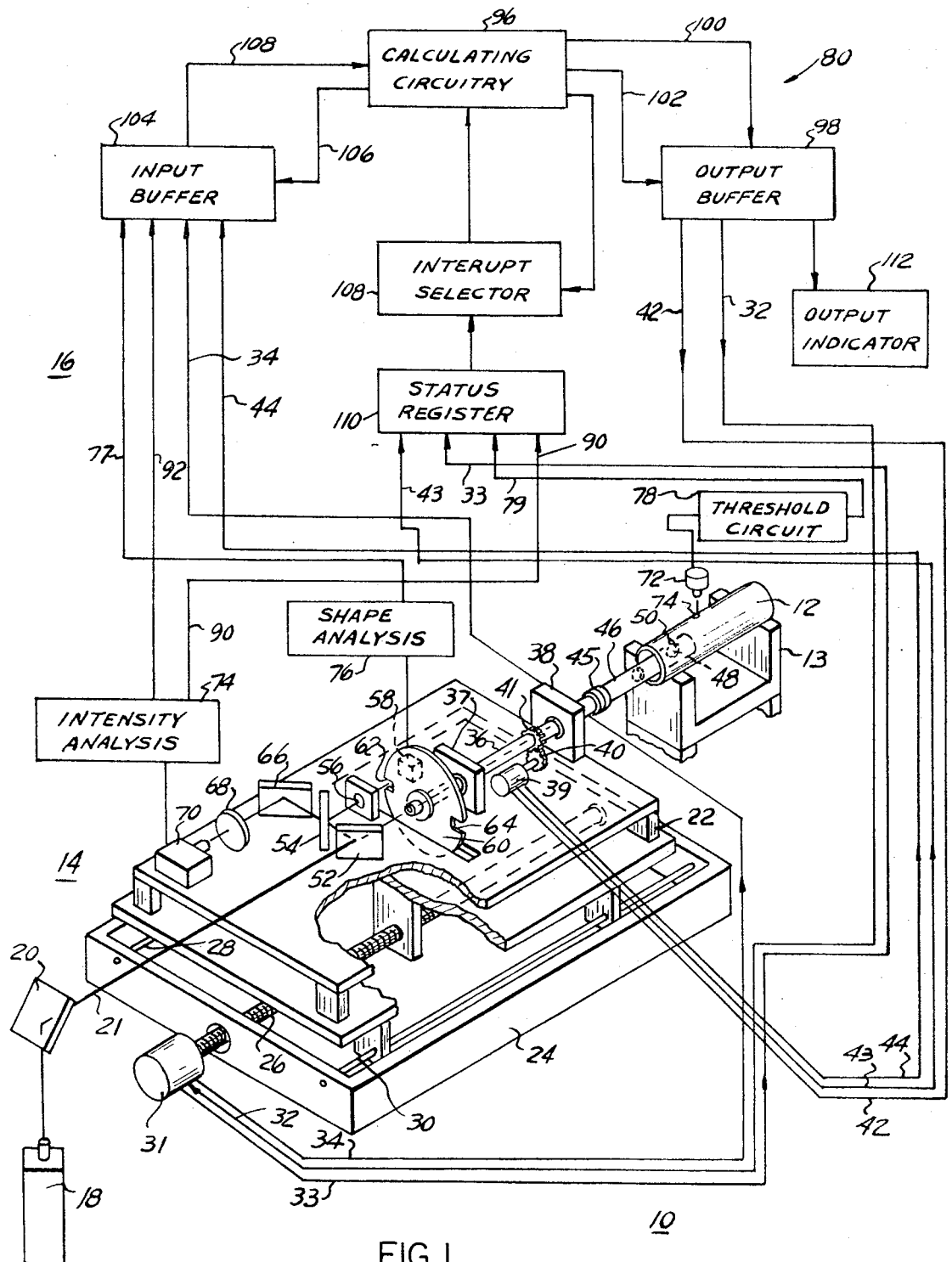
FIG. 1 is a schematic, partially three-dimensional view of an embodiment of this invention for inspecting an inside surface of a cylindrical workpiece.

FIG. 1 illustrates a system 10 for determining the quality of the inside surface of a cylindrical workpiece 12, such as a brake cylinder, held in a V-block support 13. The system 10 includes apparatus 14 for scanning a beam of wave energy, namely laser light across the inside surface of the cylinder 12, and signal processing apparatus 16 for measuring the shape and intensity of the signal modulated by the cylinder surface in order to determine the quality of that surface.

The apparatus 14 for scanning a laser beam across the inside of the cylinder 12 includes a laser source 18 and mirror 20 for providing and directing an inspecting laser beam 21 toward cylinder 12. The apparatus 14 also includes a double level platform 22 which is movably mounted on guide apparatus 24. The guide apparatus 24 includes a worm gear 26 and two smooth slides 28 and 30 which support platform 22. Platform 22 is moved toward and away from cylindrical workpiece 12 by rotation of the worm gear 26. Worm gear 26 is driven by motive means or motor 31 which responds to command signals received along line 32 and provides feedback signals along lines 33 and 34 which indicate the position of gear 26. A hollow tube 36 for transmitting inspecting beam 21 to cylindrical workpiece 12 is rotatably mounted on platform 22 by plates 37 and 38 which are fixedly attached to that platform. Tube 36 is rotated by motive means or motor 39 which drive gears 40 and 41, gear 41 being concentric with and attached to tube 36. Motive means 39 responds to command signals received along line 42 and transmits feedback signals along lines 43 and 44 indicating the position of tube 36. A mounting flange 45 for receiving a probe 46 of appropriate diameter to inspect cylindrical workpiece 12 is formed on the end of hollow tube 36 proximate workpiece 12. Probe 46 comprises a hollow tube which contains a lens 47 and mirror 48. Mirror 48 is disposed opposite an opening 50 in the probe 46 so that inspecting beam 21 is directed by the mirror 48 to strike the inside surface of cylinder 12. Lens 46 focuses beam 21 to strike a single point on the cylinder 12, and collimates light reflected or modulated by cylinder 12 so that the modulated light is not scattered and lost before being processed.

Two beam splitters 52 and 54, and a lens 56 are disposed on platform 22 to receive the beam modulated or reflected from cylinder 12 and direct a portion of the modulated beam toward a photodetector 58. Photodetector 58 receives light and provides an electric output signal that is processed to measure the cross-sectional shape of the modulated inspecting beam 21 and thereby determine the smoothness of the inside surface of cylinder 12. A light chopper wheel 60 is attached to tube 36 to rotate with that tube. Chopper wheel 60 has two notches 62 and 64 disposed 180° apart. The notches 62 and 64 permit detector 58 to receive modulated light only from opposite sides of the tube 12. Points along these sides have curvatures that spread the modulated beam in the same direction. Thus, any change in the shape of the beam striking detector 58 is caused by a change in surface roughness and is not caused by any change in the curvature of that surface. A mirror 66 and lens 68 are positioned to receive a portion of the beam of beam splitter 54 and direct that beam portion to a second photodetector 70. Photodetector 70 provides an electric output signal having a magnitude determined by the intensity of received light. The intensity of this electric output signal is processed to determine whether the inside surface of cylinder 12 contains any flaws and to determine the severity of any detected flaws. A third photodetector 72 is disposed opposite a machine hole 74 in the cylindrical workpiece 12. Detector 72 provides an output to the signal processing apparatus that prevents the processing apparatus from mistaking a machined hole or similar openinG from a flaw.

The signal processing apparatus 16 includes intensity analyzing circuitry 74 for determining the intensity of the beam reflected from cylinder 12, shape analyzing circuitry 76 for indicating the shape of the beam reflected from opposite sides of cylinder 12, and threshold circuitry 78 for preventing spurious signals unrelated to the scanned laser beam 21 from providing any indications of the nature of cylinder 12. Apparatus 16 also includes computer comparing circuitry 80 for comparing measured intensity and shape values with predetermined values in order to determine whether the workpiece 12 is acceptable.

The intensity analyzing circuitry 74 is shown in detail in FIG. 2. This circuitry includes an amplifier 82 for amplifying electric signals received from photodetector 70. A high pass filter 84 and a low pass filter 86 are connected in parallel to receive amplified signals from amplifier 82. High pass filter 84 transmits the high frequency portion of the changing signal provided by amplifier 82 and removes the low frequency portion of that signal. The signal received by filters 84 and 86 is determined by the quality of the inside surface of cylinder 12. The intensity of this signal changes when the inspecting beam 21 is scanned across a surface flaw. The output from high pass filter 84 represents the instantaneous change in the beam reflected from cylinder 12. Conversely, low pass filter 86 transmits the low frequency portion of the signal received from amplifier 82 and removes the high frequency portion of that signal. The output from low pass filter 86 represents the average intensity of the signal received from cylinder 12. A comparator 88 receives the signals provided by the high pass filter 84 and filter 86, and provides an output along line 90 to the computer apparatus 80 whenever these two signals are different. Comparator 88 thus provides an output only when a flaw is detected on the surface of cylinder 12 which causes the intensity of the beam received by detector 70 from that surface to change. Intensity analyzing circuitry 74 also provides a second output along line 92 to computer apparatus 80. This second output signal represents the intensity of the beam received from the surface of cylinder 12. Variations in the intensity of this second output signal correspond to variations in intensity in the light signal received by detector 70. In order to provide this second output signal, circuitry 74 includes an adder 96 for receiving and combining the output signals provided by high pass filter 84 and low pass filter 86. An analog to digital converter 98 converts the signals provided by adder 96 to appropriate form to be received by computing apparatus 80.

The shape analyzing circuitry 76 is a known apparatus for measuring the second order time differential of the intensity of light striking detector 58. Since the amount of light allowed to strike detector 58 at any given particular time is determined by the position of rotating chopper wheel 60, this measurement of intensity variation over a time interval is a measure of the distribution, or in other words the cross-sectional shape, of the modulated beam 21. Shape measurements are supplied to computer apparatus 80 from shape analyzing circuitry 76 along line 77. Threshold circuitry 78 is also a well known device which transmits only signals having a value larger than a predetermined value along line 79 to computer 80.

The computer calculating apparatus 80 includes calculating circuitry 96 which is adapted, for example by being appropriately programmed, to compare measured shape and intensity values with predetermined values in order to determine whether a part is defective. Calculating circuitry 96 is also adapted to generate control or command signals for controlling the scanning of laser beam 21 across the inside surface of cylindrical workpiece 12. An output buffer 98 is connected to calculating circuitry 96 by lines 100 and 102. Output buffer 98 acts as an interface between calculating circuitry 96 and the elements that are driven by the control signals calculated by circuitry 96, namely motive means 31 and 39. Buffer 98 stores calculated control signals provided by circuitry 96 until those calculated signals can be received by the drive motors. Calculated command or control signals are transmitted from calculating circuitry 96 to output buffer 98 along line 100, and code signals indentifying the nature of a particular command signal are transmitted along line 102. That is, code signals indicate whether a command signal is to direct operation of motor 31 or 39, or whether it is to control the speed or direction of motion. An input buffer 104 is attached to calculating circuitry 96 by lines 106 and 108. Buffer 104 is also an interface element between calculating circuitry 96 and other elements of the device 10. Buffer 104 receives feedback signals from motive means 31 and 39 which indicate the position of scanning beam 21, and output signals from intensity analyzing circuitry 74 and shape analyzing circuitry 76 which indicate the quality of the inside surface of cylinder 12. Buffer 104 stores these received signals until they can be appropriately received and processed by the calculating circuitry 96. Signals are transmitted from calculating circuitry 96 to input buffer 104 which indentify the type of signal to be transmitted to calculating circuitry 96. That is, these signals transmitted along line 106 determine whether signals such as those identifying the position of the scanning beam or those identifying the shape or intensity of the modulated beam are to be transmitted to the calculating circuitry 96 to be processed. Signals are transmitted from input buffer 104 to calculating circuitry 96 along line 108. An interrupt selector 108 and status register 110 provide control signals to the calculating circuitry 96 that determine the type of calculations to be performed by that calculating circuitry. Status register 110 receives signals along lines 33 and 43 from motive means 31 and 39, respectively, that indicate when a response to a last generated command signal is completed so that a subsequent command signal can be generated and received by the drive motors. And, status register 110 receives signals along lines 79 and 90 indicating the detection of a machined opening and flaw, respectively. Status register 110 provides output signals that direct calculating circuitry 96 to perform calculations appropriate with the type of signals received by status register 110. Interrupt selector 108 times the transmission of signals from status register 110 to calculating circuitry 96 so that partially completed calculations by the calculating circuitry 96 will not be interrupted at an inappropriate time. A display 112 is connected to the calculating circuitry 96 through the output buffer 98. This display receives signals which indicate whether an inspected part is acceptable or not and displays those indications for an observer.

In operation, the inspecting beam 21 is projected by mirrors 20 and 48 and by lens 47 to strike the surface of the cylindrial workpiece 12. Calculating circuitry 96 of control computer 80 generates command signals which direct motive means 31 and 39 to scan inspecting beam 21 across the inside surface of cylindrical workpiece 12. These command signals control both the speed and direction of scanning motion. Motive means 31 scans the beam along the longitudinal axis of cylinder 12, and motive means 39 rotates that beam around the axis of cylinder 12. Whenever motor 31 or 39 completes a response to one command signal, a feedback signal is transmitted along line 33 or 43 indicating that the command has been obeyed and that a subsequent command signal can be generated and transmitted to the drive motor. Feedback signals which identify the actual position of the scanned inspecting beam on the surface of cylinder 12 are transmitted along lines 34 and 44 to input buffer 104 of the computer 80.

Inspecting beam 21 is modulated and reflected by the inside surface of cylinder 12. A portion of the modulated or reflected beam is collimated by lens 46 and directed by beam splitters 52 and 54, and by lens 56 to strike detector 58. Detector 58 converts the received modulated beam to an electric signal that is transmitted to the shape analyzing circuitry 76. Chopper wheel 60 controls the transmission of the modulated beam to detector 58, and allows that detector to receive light only from opposite sides of cylinder 12. The curvature of opposite sides of a cylinder is such as to provide the modulated beam with the same cross-sectional shape so that any changes in the shape of the beam received by detector 58 are caused by changes in the surface relief or smoothness of cylinder 12. As a notch of the chopper wheel is moved past detector 58, that notch progressively increases and decreases the field of view of the detector. The shape analyzing circuitry measures the change in the intensity of the signal received by detector 58 as a function of time in order to determine the cross-sectional distribution or shape of the modulated beam. These shape measurements are transmitted to the computing apparatus 80 which compares each shape measurement to predetermined values in order to determine the smoothness of the workpiece 12.

Beam splitters 52 and 54, mirror 66, and lens 68 also direct a portion of the modulated beam to strike detector 70. Detector 70 converts the received optic signals to an electric signal which is supplied to the intensity analyzing circuitry 74. The intensity of the signal received by the analyzing circuitry 74 changes as the inspecting beam 21 is scanned across a flaw on the surface of cylinder 12. Upon detection of a flaw, circuitry 74 provides a first output signal along line 90 indicating that a flaw has been detected, and a second output signal along line 92 indicating the value of intensity of the beam reflected from the detected flaw. The signal indicating the presence of a flaw transmitted to status register 110 causes that register and interrupt selector 108 to direct calculating circuitry 96 to interrupt the generation of command signals to process the intensity measurement transmitted to input buffer 104 and determine the severity and location of the detected flaw. In order to determine the depth or severity of a flaw such as a crack, the calculating circuitry 96 compares the intensity of modulated inspecting beam received from the flaw with a reference intensity value. Since the intensity of the modulated or reflected beam will not change unless that beam is scanned across a surface flaw, a reference intensity value may be obtained by measuring intensity values for a predetermined distance along the inside surface of cylinder 12 and utilizing the measured values as a reference if the intensity of the modulated beam remains constant, indicating the absence of any flaw along the predetermined distance. A flaw might very well be so large as to not be completely illuminated at any one time by the inspecting beam 21. In order to determine the size of a flaw, the calculating circuitry 96 includes memory apparatus for storing the location of each flawed point. The locations of all flawed points are processed to determine whether a number of flawed points form a single large defect. Computer apparatus 80 identifies a workpiece as being defective upon detection of a flaw, such as a crack, having either more than a predetermined deepness or more than a predetermined size or length. Output signals which indicate whether a part is acceptable or defective are transmitted to output display 112 which displays those indications for an observer.

Having thus described an embodiment of the invention, a number of modifications will occur to those skilled in the art. Therefore, what is claimed is:

1. A system for inspecting the inside surface of a hollow cylindrical workpiece comprising:
   beam directing means including mirror means sufficiently small to fit inside the cylindrical workpiece and direct a beam of wave energy to strike and be modulated by the inside surface of said workpiece, and motive means for providing a relative rotation between said mirror means and said cylindrical workpiece to scan said beam around the inside surface of said cylinder and a relative longitudinal displacement between said mirror means and said cylindrical workpiece to scan said beam along the length of said cylindrical workpiece;
   surface smoothness determining means for measuring the cross-sectional shape of said modulated beam to determine the smoothness of said surface, said smoothness determining means including detecting means for receiving the modulated beam, chopper means for controlling the transmission of said modulated beam to said detecting means, said chopper means progressively increasing and decreasing the field of view of said detecting means, and means for measuring the time rate of change in the intensity of said modulated wave energy striking said detecting means; and
   flaw detecting means for measuring the intensity of said modulated beam to determine whether said surface contains a flaw.

2. The system of claim 1 in which said flaw detecting means comprise:
   low pass filter means for providing an output signal representing the average intensity of said modulated beam;
   high pass filter means for providing an output signal representing the instantaneous change of said modulated beam intensity; and
   comparator means for comparing the output signals from the two filter means and providing an output signal indicating the presence of a flaw in response to a difference between the compared signals.

3. The system of claim 1 in which:
   said flaw detecting means includes means for providing a first output signal indicating the presence of an intensity variation, and a second output signal indicating the value of the intensity of said modulated beam;
   the system includes computer means for generating command signals for said motive means; and
   said computer means also include control means responsive to said first and second output signals for interrupting the generation of command signals upon receipt of said first output signal from said flaw detecting means indicating the presence of a variation and initiating a determination of the value of said second signal to thereby determine the severity of a detected flaw.

4. The system of claim 1 in which:
   said motive means also provides said relative rotation to said chopper means; and
   said chopper means is shaped to prevent said detecting means from receiving said modulated beam from positions displaced from two longitudinal lines along the inside surface of said cylindrical workpiece and separated by a diameter of said cylindrical workpiece, said chopper means thereby preventing said detecting means from receiving said modulated beams from positions having different directions of curvature that alter the shape of said modulated beam in different manners and thereby provide an erroneous indication of a change in the smoothness of said workpiece surface.

5. The system of claim 4 in which said chopper means include two diametrically opposed notches for transmitting said modulated beam to said detecting means from along both of said longitudinal lines.

* * * * *